June 2, 1931.  M. DE FRANCISCO  1,808,725
SCREEN FOR MOTION PICTURES AND THE LIKE
Filed April 9, 1927
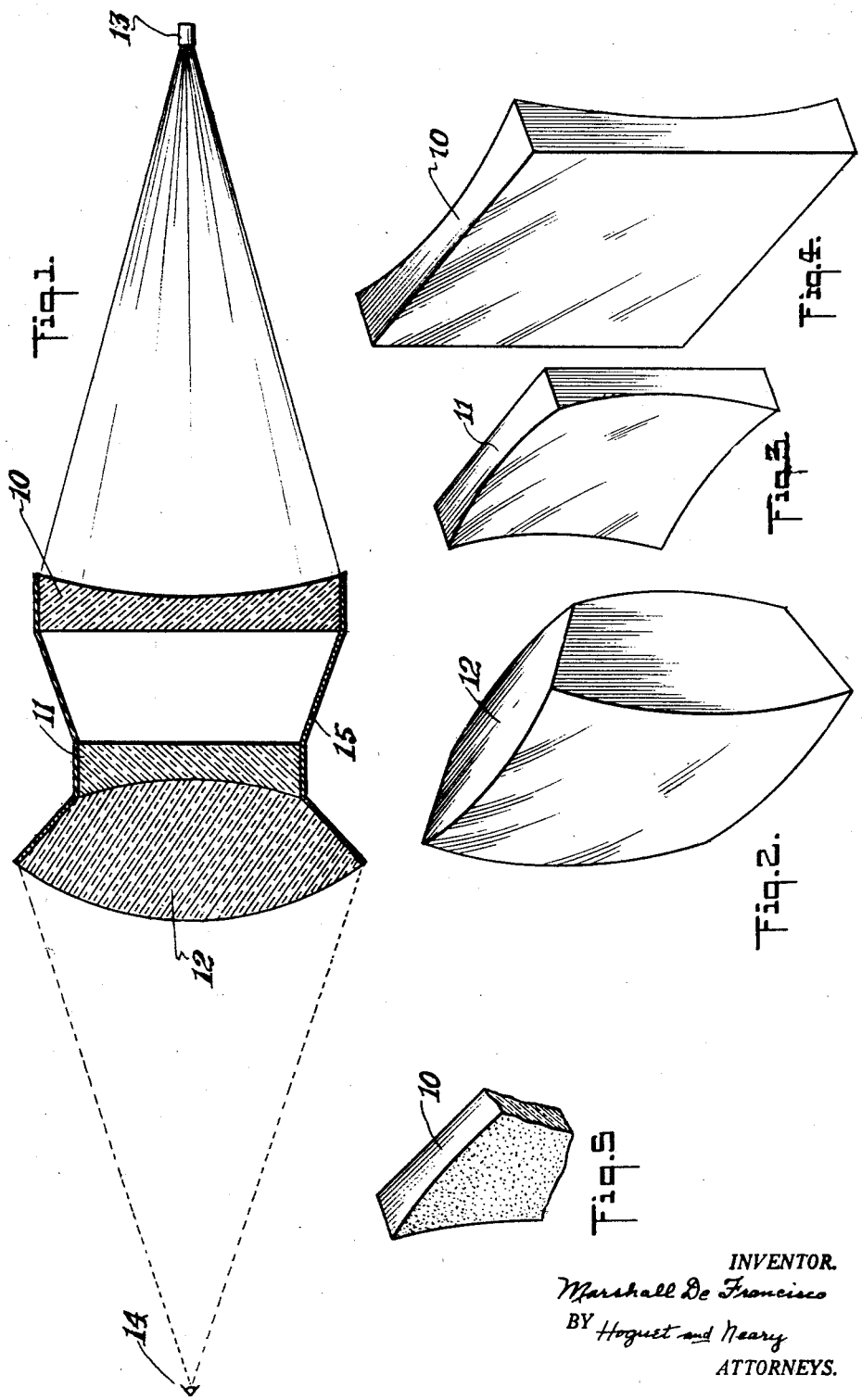
INVENTOR.
Marshall De Francisco
BY Hoguet and Neary
ATTORNEYS.

Patented June 2, 1931

1,808,725

UNITED STATES PATENT OFFICE

MARSHALL DE FRANCISCO, OF NEW YORK, N. Y.

SCREEN FOR MOTION PICTURES AND THE LIKE

Application filed April 9, 1927. Serial No. 182,218.

The present invention relates to improvements in screens for photographic reproduction.

An object of the present invention is to provide a screen on which a photographic image or picture may be produced and viewed by direct rays of light so that the image or picture may be easily seen in daylight.

Another object of the present invention is to provide a screen of such a character that the photographic image or picture projected thereon will appear as if developed in air and disposed in space.

A further object of the present invention is to provide a screen which will give a stereoptical effect to the image or picture projected thereon from the photographic film or slide.

Other objects and advantages of the present invention will appear as the description proceeds.

In the drawings:

Figure 1 is a diagrammatic sectional view of a screen constructed in accordance with the present invention;

Figures 2, 3, and 4 are perspective views of various elements employed in said screen, and Figure 5 is a fragment of one of the elements employed in the screen.

Referring now more particularly to the drawings, which show by way of illustration and example an embodiment of the invention and to the details of which I do not intend to be confined, the invention is embodied in a screen for the photographic reproduction of pictures or images which comprise a plurality of spaced light permeable or transparent elements 10, 11 and 12 arranged in such a manner that a photographic image projected upon the surface of the element 10 from a projecting instrument at 13, is adapted to be viewed by direct light by a person standing at the point 14 on the other side of the screen. Elements 10, 11 and 12 are advantageously composed of glass. The surface of the transparent element 10 nearest the source of light is preferably concave and ground to provide an image-fixing means or diffusing surface on which the picture or image is initially projected. The image is transmitted through the light permeable element 10 and through the air space on the opposite side, thence through the elements 11 and 12 so that it may be viewed by a person standing on the side of the screen opposite to the source of photographic projection. The surfaces defining the boundaries of the light permeable element 12, are preferably convex as indicated in the drawings while the transparent element 11 is adjustably positioned between the elements 10 and 12 and serves as a corrective lens to properly focus the light passing through the screen and to prevent distortion of the image. The various light permeable elements comprising my novel screen are mounted and supported in any suitable way and preferably by means of a light tight casing 15 or the like.

When my screen is used in service the photographic image or picture which is projected upon the concave surface of the member 10 may be viewed by a person on the opposite side of the screen by reason of the direct rays of light which pass through the screen. The image as viewed by the person appears to be developed in air and to be three dimensional. I do not confine myself to any precise theory for explaining the stereoptical effect obtained by my novel screen but I believe that the effect is probably the result of two factors, the concave surface on which the image is initially projected which surface forms a three dimensional medium on which the image initially appears, and also because of the fact that the transparent elements 10, 11 and 12 are composed of material of greater density than air and refraction occurs during the passage of the light rays therethrough. This refraction or lateral displacement of the light rays occurs without any substantial distortion of the image. Since a human being sees with two eyes, the image impressed upon the retina of one eye does not correspond exactly with the image impressed upon the retina of the other eye since the angles of refraction for the two eyes are slightly different. Consequently, the images impressed upon the retina of the two eyes of a human being when looking at a photographic image appearing on my screen to come from different distances and from different depths of the screen thus giving to some extent a stereoptical effect.

The fact that the light is in back of the image may possibly contribute to the stereoptical effect obtained. Whether this explanation is the correct one, my screen in actual practise does reproduce a photographic image or picture which when viewed appears to be three dimensional and developed in space or air.

I do not confine myself to the details of the screen described nor to any theory to explain its operation and desire to limit myself only by the state of the prior art and the scope of the appended claims.

Having thus described my invention what I claim as new and desire to secure by Letters Patent is:

1. A screen for photographic reproduction comprising a glass element having a curved exterior face, a second glass element in the path of light rays passing to the first element, said second glass element having a finely ground surface on which the image is first projected and acting as a screen, and a third glass element between the first and second element, said third element having a regularly curved face to produce refraction without substantial distortion, the light rays passing directly through said elements, said screen being adapted to reproduce a projected image such as to be viewed by an audience.

2. A projection screen comprising a light refractory member having a diffusing image receiving concave surface adapted to face a projecting instrument and upon which concave surface the projected image is adapted to be focused, and a positive lens adapted to refract the light rays passing through said member to render the same visible to spectators viewing the screen.

3. A screen to receive images projected from a projecting instrument, said screen comprising a glass member having a diffusing image receiving concave surface adapted to face the projecting instrument and to receive the projected image, and a positive lens to converge the rays of light passing through said member and render the same visible to a spectator viewing the positive lens.

4. A screen for images projected by a projecting device, said screen comprising a light diverging member having a diffusing image receiving concave face toward said projecting device and upon which concave face the image is adapted to be focused, said diverging member being adapted to diverge rays of light from said image passing through said member, and light refracting means adapted to converge the diverged rays passing through said member.

5. A projecting screen comprising a transparent member having a frosted concave surface adapted to receive the projected image, said member comprising a light dispersing means for the rays of light from said image, and light converging means adapted to transmit the diverged rays of light whereby the spectator upon viewing said light converging means observes an enlargement of the image projected on said concave surface.

6. A screen for observing projected images comprising a light diverging member provided with an image receiving surface upon which a visible image may be focused, light transmitting means adapted to concentrate rays of light from said image, and a light tight casing supporting said means and said member with an air gap between said means and said member, the rays of light through said member and said means being non-parallel.

7. A screen for observing projected images comprising a light refracting lens having a ground glass surface facing the projecting instrument and upon which the projected image is adapted to be focused, and a second refracting lens adapted to concentrate the rays of light from said first mentioned lens to render the same visible to a spectator viewing said screen, one of said lenses having a concave surface facing toward the projecting instrument.

8. In a screen for viewing images projected from a projecting device, a lens member having a light diffusing surface adapted to receive a projected image, a second lens adapted to transmit rays of light from said projected image, said second lens being spaced from said lens member to provide an air space between said lens member and said second lens, said air space being of substantially uniform thickness throughout the space between said lens member and said second lens.

In testimony whereof, I have signed my name to this specification this 8th day of April, 1927.

MARSHALL DE FRANCISCO.